Figure 3:
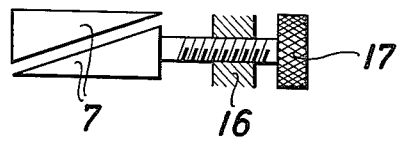

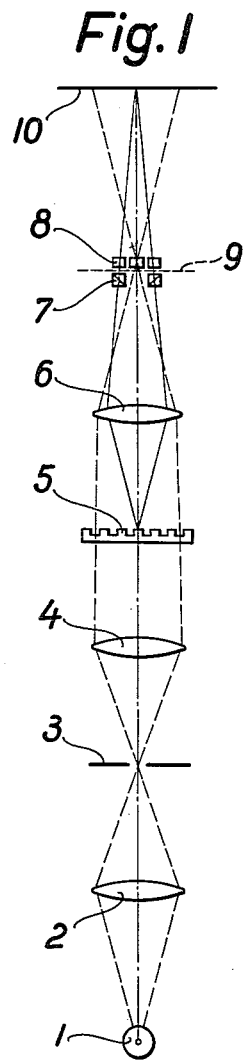
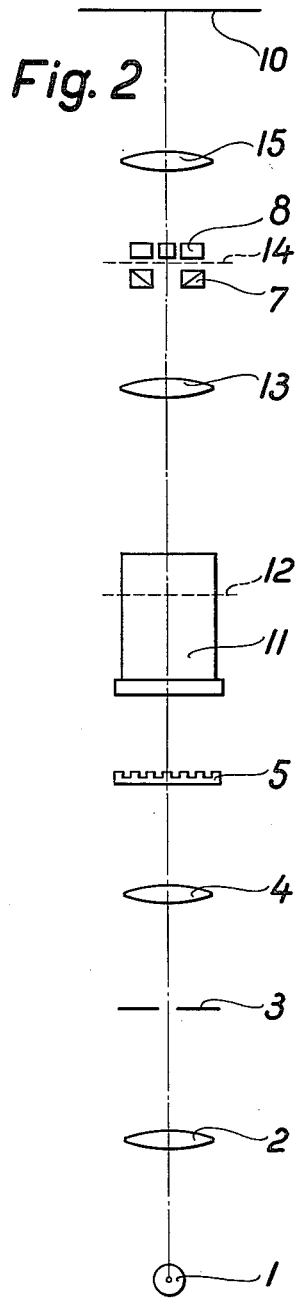

Nov. 20, 1962  P. BARTELS  3,064,527
MEANS FOR MEASURING THE OPTICAL THICKNESS AND/OR
ABSORPTION OF SMALL SPECIMENS
Filed Feb. 3, 1958  2 Sheets-Sheet 2

INVENTOR.
PETER BARTELS
BY
AGENT

United States Patent Office 3,064,527
Patented Nov. 20, 1962

3,064,527
MEANS FOR MEASURING THE OPTICAL THICKNESS AND/OR ABSORPTION OF SMALL SPECIMENS
Peter Bartels, Giessen (Lahn), Germany, assignor to Ernst Leitz G.m.b.H., Wetzlar, Germany, a corporation of Germany
Filed Feb. 3, 1958, Ser. No. 712,861
Claims priority, application Germany Feb. 4, 1957
9 Claims. (Cl. 88—39)

The present invention relates to a method of and an apparatus for the measurement of the optical thickness and/or the light absorption of objects, and more particularly, of small specimens used, for instance, in microscopy or photomicrography.

The "optical thickness" of an object is the product of its refractive index and its dimensional thickness.

Koehler's method of illumination, with top or transmitted light, has been used for measuring the optical thickness and/or the light absorption of objects. Any such top or transmitted illumination may be used in which there is a simple relation between the image contrast and a differential optical influence on the light diffracted by the object as compared to the direct light. Phase contrast, dark field, and striae methods are all usable for this purpose. The differential optical influence in the form of a phase change and/or a change of light intensity must be effected at those locations of the light beam path where the direct and the diffracted light are spatially separated. The best location therefor is the back focal plane or an intermediate image of the back focal plane of the objective used to project the images of the objects or specimens to be measured. The required spatial separation for effecting the differential optical influence on the beam diffracted by the object suffices, and the images of the objects are "true," only if the objects to be projected are exceedingly small or if they are strictly periodical and have a sufficiently small grating constant.

In practice, measurements are usually detrimentally influenced by halos of the object images which considerably distort the image contrast, particularly in the case of larger objects. This makes calculation of the measurements complicated and often practically impossible.

It is the principal object of the present invention to provide a measuring method and means free of this shortcoming and adapted to permit quantitative calculation of the measured values.

In principle, the above and other objects and advantages in accordance with this invention are attained by arranging the specimen in the back focal plane of an objective used to project the image of a diffraction grating, or in an intermediate image of the back focal plane in a plane conjugate thereto, the specimen being placed in the path of only a portion of the beam in a plane where the normal beam and the beams of higher orders are spatially separated, thereby differentially influencing the diffraction pattern of the grating, and measuring the contrast between the dark and bright stripes in the image of the diffraction grating image. The contrast measurement may be effected photometrically or by compensation of the phase change and/or the light absorption produced by the specimen. In the latter case, measurement is effected by adjusting the compensating means to the maximum or minimum contrast of the grating image.

The apparatus for carrying out the method of the invention may consist of the known Koehler's illumination arrangement and an objective arranged to project the image of a diffraction grating. The object or specimen is so arranged in the back focal plane of the objective or in a preferably enlarged intermediate image of the back focal plane that it covers only a portion of the diffraction patterns, for instance, only the normal beam coming from the diffraction grating (zero order).

In contrast to the phase contrast method, no special phase-rotating layer is used, its function being taken over by the object to be examined. If the object is not absorbing, for instance, use may be made of a phase grating whose grating strips and grating interspaces have no light absorption. If desired, the light may be further weakened at the diffraction spectra in a manner known per se from the phase contrast method.

The present invention will be more fully understood by reference to the following detailed description of two specific embodiments thereof, taken in conjunction with the accompanying drawing, wherein—

Figure 4:
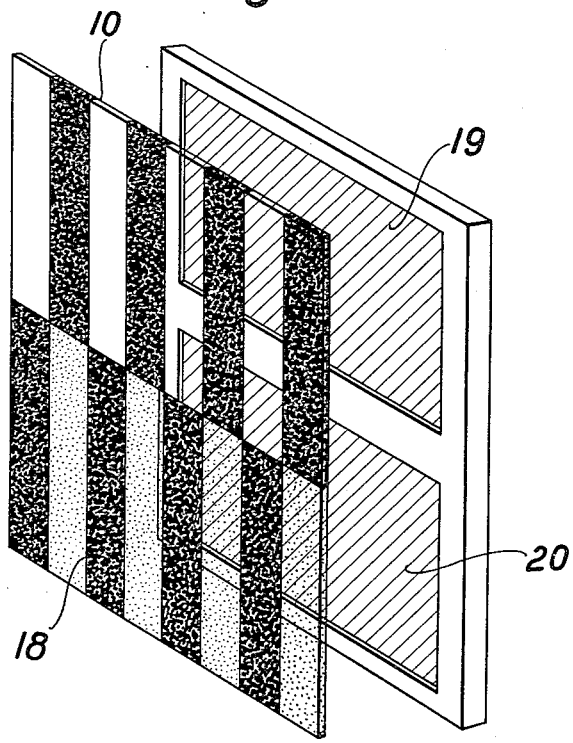

FIG. 1 is a schematic view of an optical system according to the present invention, FIG. 2 is a similar view of a different embodiment, FIG. 3 shows a conventional optical path compensation wedge means useful in the optical system, and FIG. 4 shows one embodiment of a measuring device.

In the drawing, like reference numerals in the figures designate like parts.

Referring first to FIG. 1, there is shown an optical system wherein the object or specimen is arranged in the back focal plane of the objective. The collector lens or auxiliary condenser 2 images the light source 1 in aperture 3 of condenser 4. The image of diffraction grating 5 is projected on the screen 10 by objective 6. Three measuring cells 8 are arranged in the back focal plane 9 of objective 6. The center measuring cell covers the normal beam (zero order) of the diffraction patterns of the grating and is filled with a solution to be examined. The two outer measuring cells contain the solvent. Compensation wedges are designated at 7.

As shown in FIG. 3, the compensation wedges comprise two wedge-shaped optical members whose relative position may be measurably adjusted by means of set screw 17 threadedly mounting one of the wedges on bearing 16. The optical path through the compensation wedges can be adjusted by changing the relative position of the two wedges.

FIG. 2 illustrates a basically similar optical system, wherein the object or specimen is arranged in the conjugate plane of the back focal plane of the objective. In this case, a strong objective 11 is used, the focal plane 12 of the objective being in the interior thereof. The lens 13 produces an intermediate image 14 of the focal plane 12, the measuring cells 8 and compensating means 7 being placed in the plane of the intermediate image. An additional objective 15 images the grating 5 on screen 10.

The optical systems illustrated by way of example in FIGS. 1 and 2 are well adapted for the examination of very dilute solutions contained in a measuring cell of known thickness. The measuring cell may be very small since it must cover only a single diffraction pattern or image, i.e. the normal beam. Therefore, it is possible to use minute amounts of substance, for instance, biological preparations.

Measurement may be effected in the following manner:

The optical path difference and the absorption produced by the specimen produces a phase change between the normal beam passing through the specimen and the beams of different order passing through the other measuring cells. This phase change, however, may be nullified if compansation wedges are placed in the path of the beams of different order and the wedges are so adjusted as to compensate between the latter beams and the normal beam. If the optical paths of all beams are thus equalized, there will be no phase contrast and no phase contrast image. The adjustment of the wedge means necessary for obtaining this condition is measurable. If the specimen is not fully transparent, i.e. if it absorbs some light, the glass wedges 7 may be also somewhat absorptive, i.e. of smoked glass.

On the other hand, instead of compensating the optical paths, the phase contrast between the normal beams and the other beams may be measured on the screen 10 by determining the ratio of light between the dark and light spots in the grating image with a photometer. The contrast measurement may be effected visually in the conventional manner or photoelectrically. In the latter case, one or more dark patterns of the grating image are projected on a photocell and the light patterns on another photocell. The difference between the photoelectric currents of the two cells are then electrically measured.

While the specimen is used preferably to influence the normal beam (zero order) of the diffraction pattern (of the direct light), all beams (the other orders) from the diffraction pattern are also needed to produce the image of the grating. The beams of different order than normal or zero by-pass the specimen. If desired, the latter beams may be passed through measuring cells, too, as shown in the illustrated embodiments, these measuring cells containing the solvent of the solution to be examined.

If a linear diffraction grating and a slit light source are used, the diffraction patterns will have a certain longitudinal dimension. The measuring cells may then extend over the length of the diffraction pattern. If the solution to be examined has a gradient of its optical properties along this dimension (for instance, in a centrifuge or electrophoresis apparatus), a stop may be moved along the measuring cell to determine the change of the optical parameters.

As shown in FIG. 4, a striped stop 18 may be placed over screen 10, the stripes of the stop being arranged parallelly to the grating images. In the lower half of the stop, the black stripes cover the images of the grating while the upper black stop stripes cover the images of the grating interspaces. Measurement, in the illustrated embodiment, is effected by photoelectrical means, two photoelectric receivers 19 and 20 being arranged behind screen 10 and stop 18.

While the invention has been described in connection with certain specific embodiments, it will be understood that many modifications and variations may occur to the skilled in the art, particularly after benefiting from the present teaching, without departing from the spirit and scope of the present invention as defined in the appended claims.

I claim:

1. An optical system for measuring the optical thickness and light absorption of a specimen, comprising a light source, an optical aperture means transmitting a normal beam from said light source, an objective having a back focal plane in the path of the transmitted light beam, a diffraction grating in said path between the aperture means and the objective, said objective producing a diffraction pattern of said grating formed of beams of higher order, the specimen being placed in the back focal plane in the path of a single one of the beams, adjustable optical compensating means in said back focal plane in the path of the other beams, and an image-receiving screen receiving the normal beam and the higher order beams coming from the optical compensating means, adjustment of the compensating means changing the optical contrast between the beams on the screen and thus indicating the optical thickness and light absorption of the specimen.

2. The optical system of claim 1, wherein said light source is a Koehler's illumination system.

3. The optical system of claim 1 wherein the specimen is placed in the normal beam.

4. The optical system of claim 1, wherein said light source is a Koehler's illumination system having a slit-like aperture and the diffraction grating has a plurality of lines extending parallel to the slit-like aperture.

5. An optical system for measuring the optical thickness and light absorption of a specimen, comprising a light source, an optical aperture means transmitting a normal beam from said light source, an objective having a back focal plane in the path of the transmitted light beam, a diffraction grating in said path between the aperture means and the objective, said objective producing a diffraction pattern of said grating formed of beams of higher order, the specimen being placed in the path of a single one of the beams in a place conjugate to said back focal plane, adjustable optical compensating means in said back focal plane in the path of the other beams, and an image-receiving screen receiving the normal beam and the higher order beams coming from the optical compensating means, adjustment of the compensating means changing the optical contrast between the beams on the screen and thus indicating the optical thickness and light absorption of the specimen.

6. The optical system of claim 5, wherein said light source is a Koehler's illumination system.

7. The optical system of claim 5, wherein the specimen is placed in the normal beam.

8. The optical system of claim 5, wherein said light source is a Koehler's illumination system having a slit-like aperture and the diffraction grating has a plurality of lines extending parallel to the slit-like aperture.

9. An optical system for measuring the optical thickness and light absorption of a specimen, comprising a light source, an optical aperture means transmitting a normal beam from said light source, an objective in the path of the transmitted light beam, a diffraction grating in said path between the aperture means and the objective, said objective producing a diffraction pattern of said grating formed of beams of higher order, the specimen being placed in the path of a single one of the beams in a plane where said beams are spatially separated, adjustable optical compensating means in said plane in the path of the other beams, and an image-receiving screen receiving the normal beam and the higher order beams coming from the optical compensating means, adjustment of the compensating means changing the optical contrast between the beams on the screen and thus indicating the optical thickness and light absorption of the specimen.

References Cited in the file of this patent

UNITED STATES PATENTS

| | | |
|---|---|---|
| 2,688,899 | Rantsch | Sept. 14, 1954 |
| 2,694,340 | Horn | Nov. 16, 1954 |
| 2,745,310 | Horn | May 15, 1956 |
| 2,795,991 | Tuzi | June 18, 1957 |
| 2,826,956 | Simmons | Mar. 18, 1958 |